July 13, 1965  H. V. HANSEN  3,194,322
HITCH DEVICE

Filed Dec. 13, 1963  2 Sheets-Sheet 1

INVENTOR.
HAROLD V. HANSEN
BY
ATTORNEY

United States Patent Office 3,194,322
Patented July 13, 1965

3,194,322
HITCH DEVICE
Harold V. Hansen, Hillsdale, Ill., assignor to Deere & Company, Moline, Ill., a corporation of Delaware
Filed Dec. 13, 1963, Ser. No. 330,439
2 Claims. (Cl. 172—310)

The present invention relates generally to hitch devices and more particularly to hitch devices used to connect a planter to a tractor where other ground-working equipment is carried by the tractor. The object and general nature of the present invention is the provision of a hitch device to be used in drawing a planter through a field which is concurrently being worked or tilled by other apparatus carried by the tractor. By employing this structure it is possible to plow a field in the fall and then concurrently till it and plant it in the spring, thus reducing the number of separate operations required by the farmer when planting the field.

More specifically it is an object of the present invention to provide a hitch device having a longitudinally extending main frame which is secured at the forward end to a tractor for rocking movement about a generally transverse axis, the rear portion of the main frame being securable to a planter and also being supported by ground-engaging means. Another object of the present invention is to provide an extension frame for use with a planter, the extension frame interconnecting the planter with the main frame of a hitch device that is in turn securable to a tractor for rocking movement about a transverse axis.

Another object of the present invention is the provision of depending hook means on a tractor to receive spaced apart rod portions carried by a main frame of a hitch device, the rod portions being secured within the hooks whereby the main frame can rock about a generally transverse axis.

Another object of the present invention is to provide a draft device secured to the tractor for swinging movement about a transverse axis, and having a planter secured at its rear portion for swinging movement about a generally vertical axis, the rear portion of the hitch device being supported by a castering wheel means.

These and other objects and advantages of this invention will be apparent to those skilled in the art after a consideration of the following detailed description, taken in conjunction with the accompanying drawings in which the preferred form of this invention is illustrated.

In the following description right-hand and left-hand reference is determined by standing to the rear of the equipment and facing the direction of travel.

Figure 6:
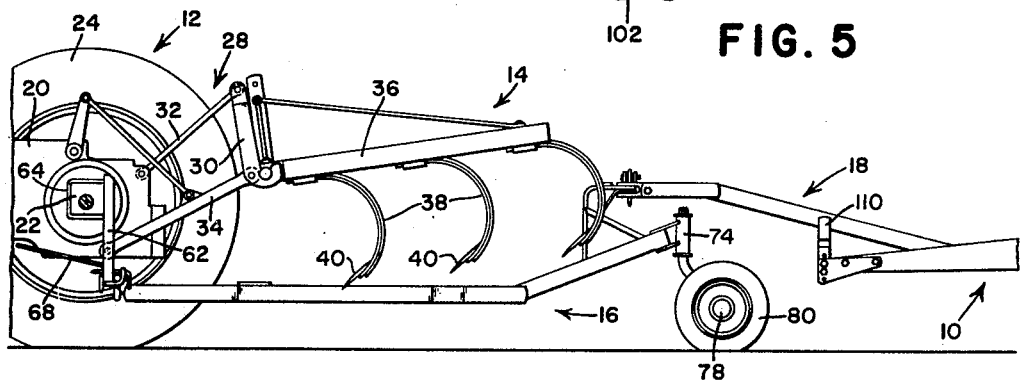
FIG. 6 is a side view of a portion of a tractor having a three-point hitch to which a ground-working implement is carried, the tractor drawing the hitch device of the present invention to which the forward draft frame of a planter is secured.

The hitch device of the present invention, as seen in FIG. 6 is adapted to secure a planter 10 to a tractor 12 having a tillage implement 14 mounted thereon, the device including a main frame 16 and an extension frame 18.

The tractor, of which only a portion is illustrated, is of a conventional construction having a fore-and-aft extending main body portion 20 on which is mounted a transverse rear axle 22. Mounted on the axle are right and left rear wheels 24 and 26. A three-point hitch, indicated generally at 28 is secured to the main body portion 20 of the tractor, and an implement coupler, similar to the type shown in the Hess Patent No. 3,048,228, issued August 7, 1962, is mounted on the upper compression link 32 and lower draft links 34 of the three-point hitch.

The tillage implement 14 may be a conventional tool bar 36 having secured thereto standards 38 which carry appropriate ground-working devices 40. This form of tillage implement is illustrated in FIG 6, however it should be noted that this invention is not limited to the particular form of tillage implement and that widely different forms of tillage implements may be employed, such as for example, disk harrows, peg-tooth harrows, and other devices capable of preparing a seed bed. It should also be noted that it is not necessary to employ the implement coupler 30, and that, in fact, the tillage implement 14 may be connected directly to the three-point hitch 28 of the tractor in a conventional manner.

Figure 1:
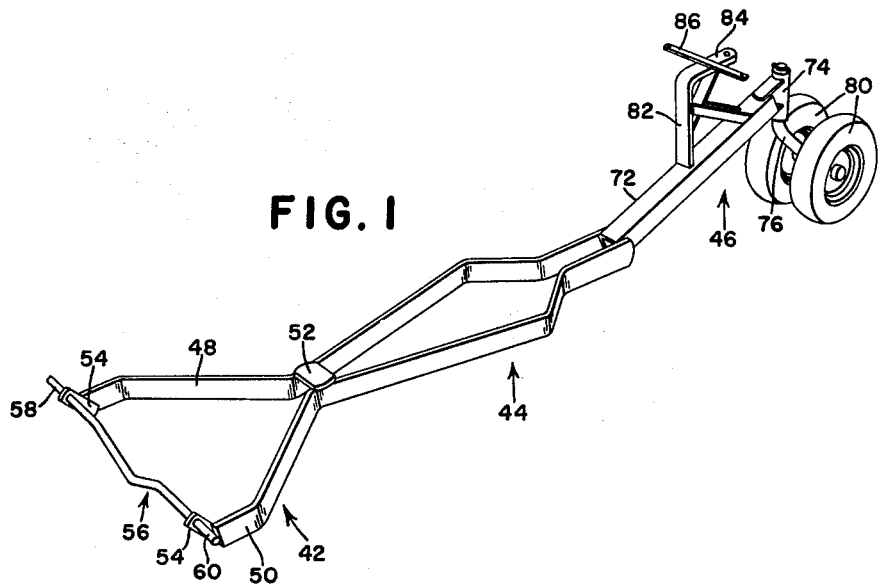
FIG. 1 is a perspective view of a hitch device in which the principles of this invention have been incorporated.
Figure 2:
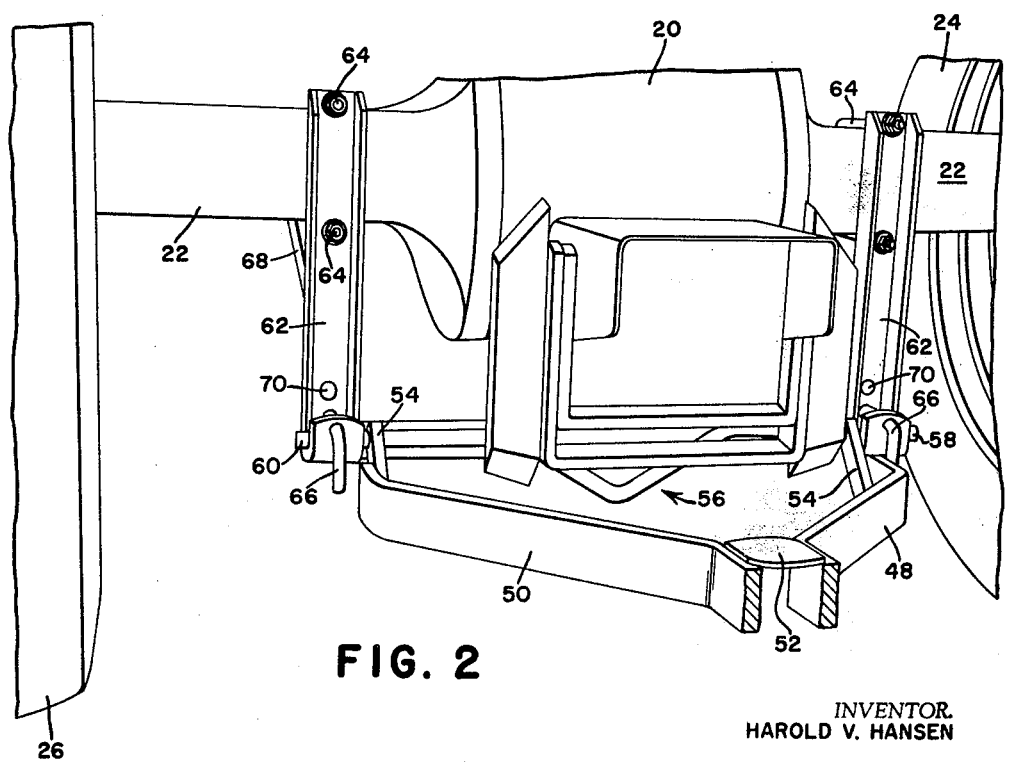
FIG. 2 is an enlarged perspective view of a tractor provided with securing means to which the hitch device of the present invention has been secured.
Figure 3:
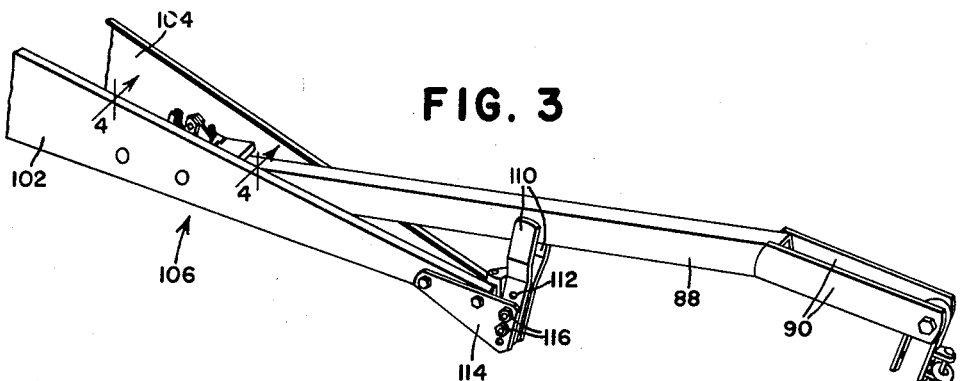
FIG. 3 is an enlarged perspective view of the forward draft frame of a conventional planter equipped with an extension frame of the present invention.

The main frame portion of the hitch device of the present invention, as best seen in FIG. 1, includes a forward bifurcated portion 42, an intermediate portion 44, and a rear portion 46. The forward portion 42 has right and left rails 48 and 50, respectively, which are secured at their point of intersection to a plate 52. The forward ends of the rails 48 and 50 are secured to brackets 54 which are apertured and through which a rod 56 passes and is rigidly secured thereto. The rod has right- and left-hand portions, 58 and 60, respectively, which extend outside the brackets 54 and are adapted to be secured to connecting means carried by the tractor which permit up and down swinging movement of the main frame about a generally transverse axes defined by the portions 58 and 60, but which restrict any right and left swinging movement of the rear end of the main frame of the hitch device. The connecting means includes generally J-shaped brackets 62 which are secured to the axle 22 by means of U-bolts 64. The ends of the rod are received in the hook portion of the J-shaped brackets 62 and are held there by means of locking pin means 66. The lower portion of each of the J-shaped brackets is reinforced against front and rear swinging movement by a truss rod 68 which is secured at its rearward portion 70 to a lower portion of the associated J-shaped bracket, and at its forward portion (not illustrated) to a portion of the main body 20 of the tractor 12.

The intermediate portion of the main frame 16 is formed preferably by extensions of the right and left rails 48 and 50, respectively, which extend rearwardly and outwardly for a major portion of their distance, and then come together again at their rearmost position where they are secured to the forward end of the box frame member 72 which forms the principal portion of the rear portion of the main frame. By having the rails 48 and 50 spaced apart in the intermediate portion, it is possible to receive a central standard carried by the tool bar 36. However, if the standard is not provided with a center sweep, it may be preferable to extend the box frame member 72 forwardly to the point where the rails 48, 50 are secured to the plate 52.

The rear portion 46 has in addition to the box frame member 72, a generally vertically disposed sleeve section 74 rigidly secured in any conventional manner to the rearward end of the frame member 72, the sleeve receiving therein the upper end of a standard 76 which carries at its lower end a transverse axle 78 on which are journaled for rotation to wheels 80. Thus the wheels are mounted for castering movement relative to the main frame 16. An upwardly projecting member 82 is secured to the midportion of the rear portion 46, and has a rearwardly extending apertured portion 84 which is adapted to pivotally receive the extension frame 18. Extending transversely of the member 82, is a bar 86 to which the planter marker chains, not illustrated, may be secured.

Figure 4:
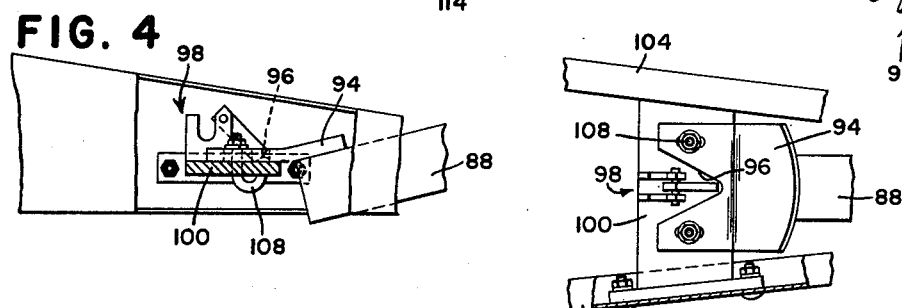
FIG. 4 is an enlarged sectional view taken along the line 4—4 of FIG. 3.
Figure 5:
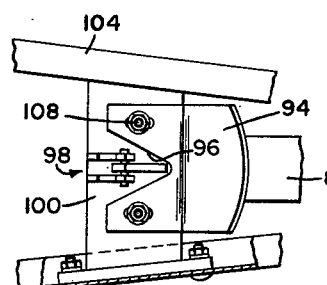
FIG. 5 is a plan view of the structure shown in FIG. 4.

The extension frame 18 includes a main beam 88 which carries at its forward end right- and left-hand forwardly extending plates 90 which in turn carry the clevis 92, normally carried by the planter 10, the clevis being securable to the apertured portion 84. The rearward portion of the beam 88 has rigidly secured thereto a plate 94 which is slightly angled, as best seen in FIG. 4, and which is provided with a V-shaped cut-out 96 that is adapted to straddle the locking device 98 carried by the transverse plate 100 which is secured to the right- and left-hand sides 102, 104, respectively, of the draft frame 106 of a conventional planter, such as the type illustrated in Patent No. 3,059,705 to W. P. Oehler et al., issued October 23, 1962. The plate 94 is secured to the plate 100 by means of conventional J-bolts 108. Rigidly secured to an intermediate portion of the main beam 88 is a downwardly depending member 110 which is suitably apertured at 112 and it is securable to the plates 114 carried by the planter draft frame by means of conventional bolts 116.

The operation of applicant's device should be obvious from the foregoing description to those skilled in the art. However, it should be particularly noted that the manner in which the main frame 16 is secured to the tractor, and the fact that its rear end is supported by castering wheels 80, permits the frame 16 to move with the tillage implement 14, that is it remains oriented with the implement 14 so that a center sweep may pass between the rails 48 and 50 even though the tractor is making a turn. It should also be noted that by the employment of applicant's hitch device, it is possible to both till the soil and plant the soil at the same time thus reducing the number of times it is necessary to traverse the field by a tractor.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

I claim:

1. The combination of a tractor having a three-point hitch with a ground-working device mounted thereon; a planter having a forwardly extending draft frame; a hitch device interconnecting the tractor and the planter, said hitch device including a longitudinally extending main frame and a planter extension frame swingably interconnecting the draft frame of the planter with the main frame, the main frame having a forward bifurcated portion and a rear portion, a generally transverse rod interconnecting said bifurcated portions and having a portion rotatably securing said main frame to said tractor, castering wheel means supporting a rear portion of said main frame, and an upstanding apertured portion rigidly carried by said rear portion, the planter extension frame including a principal frame member, a generally flat plate interconnecting the rear portion of said principal frame member with a transverse plate on an intermediate portion of the draft frame of the planter, a downwardly extending apertured member interconnecting the intermediate portion of said principal frame with the forward end of the planter draft frame, and a forwardly extending bifurcated portion, said bifurcated portion carrying clevis means swingably secured to the upstanding apertured portion.

2. The combination of a tractor having a three-point hitch with a ground-working device mounted thereon, a hitch device having forward and rear portions, and a planter having a forwardly extending draft frame, means pivotally connecting the forward portion of the draft frame with the rear portion of the hitch device, the rear portion of said hitch device carrying a ground-engaging castering wheel and the forward portion of said hitch device having spaced apart transversely extending rod portions, said tractor having a transversely extending rear axle supporting ground-engaging wheels at the outer end portions thereof, attaching bracket means rigidly secured to opposite side portions of said axle and extending downwardly therefrom, rearwardly extending hooks on the lower end of said attaching bracket means, the hooks receiving said rod portions therein, and means to hold said rod portions within said hooks whereby said hitch device can rock up and down relative to the tractor by the transverse axis defined by the rod portions.

References Cited by the Examiner

UNITED STATES PATENTS

| 1,116,011 | 11/14 | Carpenter | 111—1 X |
| 1,336,902 | 4/20 | Healy | 111—1 |
| 1,493,448 | 5/24 | Krotz | 111—1 |
| 1,872,066 | 8/32 | Erdman | 280/476 |
| 2,004,213 | 6/35 | Paul | 56—6 |
| 2,495,928 | 1/50 | Geraldson | 280—460 |
| 2,577,363 | 12/51 | Poynor | 111—1 |
| 2,622,891 | 12/52 | Knapp | 280—476 |
| 2,646,738 | 7/53 | Denning | 172—175 |
| 2,940,531 | 6/60 | Schaap | 111—52 X |

FOREIGN PATENTS

| 918,364 | 10/46 | France |
| 1,032,444 | 3/53 | France |

T. GRAHAM CRAVER, *Primary Examiner.*

ABRAHAM G. STONE, *Examiner.*